United States Patent
SenGupta et al.

(10) Patent No.: US 10,399,877 B2
(45) Date of Patent: Sep. 3, 2019

(54) IN-SITU, SELF-ADJUSTING STABILITY CONTROL OF METHANE-PRODUCING ANAEROBIC BIOLOGICAL REACTORS THROUGH NOVEL USE OF ION EXCHANGE FIBERS

(71) Applicant: Lehigh University, Bethlehem, PA (US)

(72) Inventors: Arup K. SenGupta, Bethlehem, PA (US); Derick G. Brown, Bethlehem, PA (US); Yu Tian, Bethlehem, PA (US)

(73) Assignee: LEHIGH UNIVERSITY, Bethlehem, PA (US)

( * ) Notice: Subject to any disclaimer, the term of this patent is extended or adjusted under 35 U.S.C. 154(b) by 0 days.

(21) Appl. No.: 15/714,547

(22) Filed: Sep. 25, 2017

(65) Prior Publication Data

US 2018/0086654 A1    Mar. 29, 2018

Related U.S. Application Data

(60) Provisional application No. 62/398,719, filed on Sep. 23, 2016.

(51) Int. Cl.
| | |
|---|---|
| *C02F 3/28* | (2006.01) |
| *C02F 1/42* | (2006.01) |
| *C02F 3/34* | (2006.01) |
| *C02F 101/22* | (2006.01) |
| *C02F 101/20* | (2006.01) |

(52) U.S. Cl.
CPC ............ *C02F 3/2866* (2013.01); *C02F 1/42* (2013.01); *C02F 3/2806* (2013.01); *C02F 3/341* (2013.01);
(Continued)

(58) Field of Classification Search
CPC ...... C02F 3/2866; C02F 3/2806; C02F 3/341; C02F 1/42; C02F 2101/20; C02F 2101/22
(Continued)

(56) References Cited

U.S. PATENT DOCUMENTS

2006/0243604 A1* 11/2006 Nakagawa ............... C02F 1/42
                                                            205/775
2010/0044245 A1*  2/2010 Cervantes ........... B01D 53/8678
                                                            205/748
(Continued)

FOREIGN PATENT DOCUMENTS

CN          105565604 A  *  5/2016

OTHER PUBLICATIONS

Machine-generated English translation of CN 105565604, generated on Nov. 13, 2018.*

(Continued)

*Primary Examiner* — Fred Prince
(74) *Attorney, Agent, or Firm* — FisherBroyles, LLP

(57) ABSTRACT

An anaerobic biological reactor comprising an anaerobic digester having a chamber configured to receive a microbial suspension, a chamber inlet configured to direct an organic waste stream into the digester, and ion-exchange fibers within the chamber in position to contact and chemically react with microbial suspension received into the chamber. A method for treating organic waste with a methane-producing anaerobic biological reactor comprise providing a methane-producing anaerobic biological reactor comprising an anaerobic digester containing a microbial suspension comprising acetogenic bacteria, methanogenic bacteria and a plurality of ion exchange fibers, introducing organic waste into the anaerobic digester, maintaining the microbial suspension in contact with the organic waste and at least a portion of the plurality of ion-exchange fibers for a period of time and under conditions sufficient to treat the organic waste and produce methane, and removing the treated organic waste and methane from the anaerobic digester.

4 Claims, 15 Drawing Sheets

(52) U.S. Cl.
CPC ...... *C02F 2101/20* (2013.01); *C02F 2101/22* (2013.01); *Y02E 50/343* (2013.01)

(58) Field of Classification Search
USPC .................. 210/603, 660, 661, 663, 669
See application file for complete search history.

(56) References Cited

U.S. PATENT DOCUMENTS

| | | | |
|---|---|---|---|
| 2011/0203992 A1* | 8/2011 | Liu .................. | C02F 1/286 210/607 |
| 2014/0048489 A1* | 2/2014 | Hirai ................ | G21F 9/12 210/683 |
| 2014/0096783 A1* | 4/2014 | Sebastian .......... | A24D 3/0204 131/332 |
| 2015/0239761 A1* | 8/2015 | Smith ............... | C02F 1/42 210/631 |

OTHER PUBLICATIONS

Economy et al., "Polymeric Ion-Exchange Fibers," Ind. Eng. Chem. Res., vol. 41, 2002, pp. 6436-6642.

German et al., "Hydrogen Ion (H+) in Waste Acid as a Driver for Environmentally Sustainable Processes: Opportunities and Challenges," Environ. Sci. Technol., vol. 47, 2013, pp. 2145-2150.

Greenleaf and Sengupta, "Environmentally Benign Hardness Removal Using Ion-Exchange Fibers and Snowmelt," Environ. Sci. Technol.,, vol. 40, No. 1, 2006, pp. 370-376.

Greenleaf et al., "Two Novel Applications of Ion Exchange Fibers: Arsenic Removal and Chemical-Free Softening of Hard Water," Environmental Progress, vol. 25, No. 4, Dec. 2006, pp. 300-311.

Mitra, et al., "Evaluating Composite Ion Exchangers (CIX) for Improved Stability of Anaerobic Biological Reactors," Wat. Res. vol. 32, No. 11, 1998, pp. 3267-3280.

Sengupta, et al., "Ion-Exchange Resins for Improved Stability in Biological and Enzymatic Reactors," AIChE Journal, Oct. 1989, vol. 35, No. 10, pp. 1745-1748.

Tian et al., "In-Situ Stability Control of Energy-Producing Anaerobic Biological Reactors through Novel Use of Ion Exchange Fibers," ACS Sustainable Chemistry & Engineering, 2017, pp. A-J.

Tian et al., Supporting Information—"In-Situ Stability Control of Energy-Producing Anaerobic Biological Reactors through Novel Use of Ion Exchange Fibers," ACS Sustainable Chemistry & Engineering, 2017, pp. S1-S15.

* cited by examiner

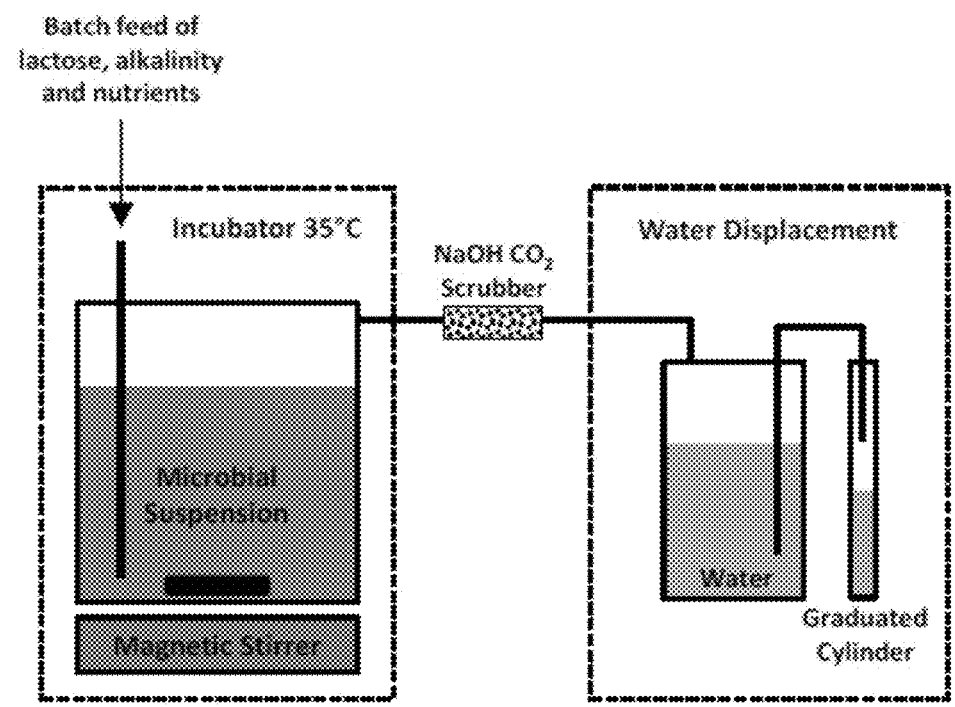
FIG. 13A  System Schematic
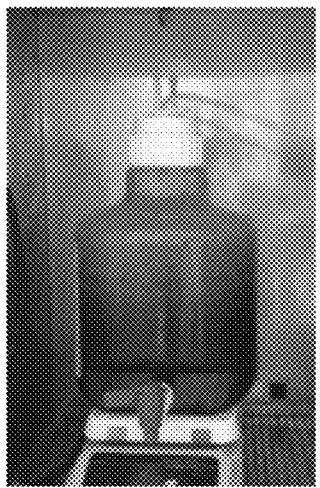
FIG. 13B  Mother Reactor
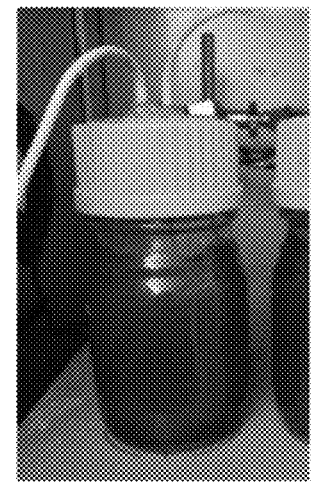
FIG. 13C  Bench-Scale Reactor

IN-SITU, SELF-ADJUSTING STABILITY CONTROL OF METHANE-PRODUCING ANAEROBIC BIOLOGICAL REACTORS THROUGH NOVEL USE OF ION EXCHANGE FIBERS

CROSS-REFERENCE TO RELATED APPLICATION

This application claims the benefit of priority under 35 U.S.C. § 119(e) of U.S. Provisional Patent Application No. 62/398,719, filed Sep. 23, 2016, the entire disclosure of which is hereby incorporated herein by reference.

BACKGROUND OF THE INVENTION

The use of methane-producing anaerobic biological reactors (MPABRs), such as anaerobic digestion, is particularly attractive for treating high-strength organic wastes as it produces a methane-rich biogas, does not require any external supply of oxygen (as with aerobic treatment) and produces only a small amount of sludge. In spite of these advantages, industry is often hesitant to use MPABRs for treating high-strength industrial wastewaters due to its susceptibility to pH change and heavy metal toxicity.

SUMMARY OF THE INVENTION

In one aspect the invention provides an anaerobic biological reactor, comprising an anaerobic digester having a chamber configured to receive a microbial suspension; an inlet in fluid communication with the chamber, the inlet being configured to direct an organic waste stream into the anaerobic digester; and a plurality of ion-exchange fibers disposed within the chamber in position to contact and chemically react with microbial suspension received into the chamber of the anaerobic digester.

In various embodiments the microbial suspension is disposed within the chamber.

In various embodiments the microbial suspension comprises acetogenic bacteria and methanogenic bacteria.

In various embodiments the methanogenic bacteria has an optimal pH range between about 6.8 and 7.2.

In various embodiments the anaerobic digester further comprises an outlet in fluid communication with the chamber, the outlet being configured to exhaust treated wastewater and methane produced in the anaerobic digester.

In various embodiments at least a portion of the ion exchange fibers are physically attached to the anaerobic digester.

In various embodiments the ion-exchange fibers have a diameter of about 30 μm.

In various embodiments the ion-exchange fibers comprise at least one iminodiacetate functional group.

In various embodiments the ion-exchange fibers have a proton adsorption capacity of about 0.49 meq-$H^+$/g-fiber.

In various embodiments the ion-exchange fibers comprise FIBAN X-1.

In various embodiments the anaerobic biological reactor comprises at least about 5 g/L ion-exchange fibers.

In various embodiments the anaerobic biological reactor comprises at least about 10 g/L ion-exchange fibers.

In another aspect the invention provides a methane-producing anaerobic biological reactor, comprising an anaerobic digester containing a microbial suspension, the microbial suspension comprising acetogenic bacteria and methanogenic bacteria; an inlet configured to direct an organic waste stream into the anaerobic digester; a plurality of ion-exchange fibers disposed within the anaerobic digester in position to react with the microbial suspension; and an outlet for directed treated waste and methane produced in the anaerobic digester away from the anaerobic digester.

In another aspect, the invention provides a method for treating organic waste with a methane-producing anaerobic biological reactor, comprising providing a methane-producing anaerobic biological reactor comprising an anaerobic digester containing a microbial suspension comprising acetogenic bacteria, methanogenic bacteria and a plurality of ion exchange fibers; introducing organic waste into the anaerobic digester; maintaining the microbial suspension in contact with the organic waste and at least a portion of the plurality of ion-exchange fibers for a period of time and under conditions sufficient to treat the organic waste and produce methane; and removing the treated organic waste and methane from the anaerobic digester.

In various embodiments the ion-exchange fibers stabilize the methane-producing anaerobic biological reactor.

In various embodiments the ion-exchange fibers are physically attached to the anaerobic digester.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIG. 3A depicts methane generation. FIG. 3B depicts pH.

FIG. 4A depicts methane generation. FIG. 4B depicts pH. FIG. 4C depicts chemical oxygen demand (COD).

FIGS. 5A and 5D depict methane generation. FIGS. 5B and 5E depict pH. FIGS. 5C and 5D depict COD.

FIG. 9A depicts methane generation. FIG. 9B depicts pH.

FIGS. 12A-12C show results for an input of nickel. FIGS. 12D-12F show results for an input of copper. FIGS. 12G-12I show results for an input of chromate.

FIGS. 13A-13C depict reactor designs. FIG. 13A depicts a schematic of the experimental apparatus, showing reactor and water displacement apparatus. The NaOH $CO_2$ scrubber consisted of a 100 mL syringe body, filled with NaOH pellets and sealed with a rubber stopper, a needle was inserted through the stopper and tubing was connected to both ends, allowing the gas to flow from the Mother Reactor headspace through the syringe into the water displacement apparatus. FIG. 13B depicts an embodiment of a mother reactor. FIG. 13C depicts an embodiment of a bench-scale reactor.

FIG. 15A depicts methane production. FIG. 15B depicts pH. FIG. 15C depicts aqueous nickel.

DEFINITIONS

Figure 1:
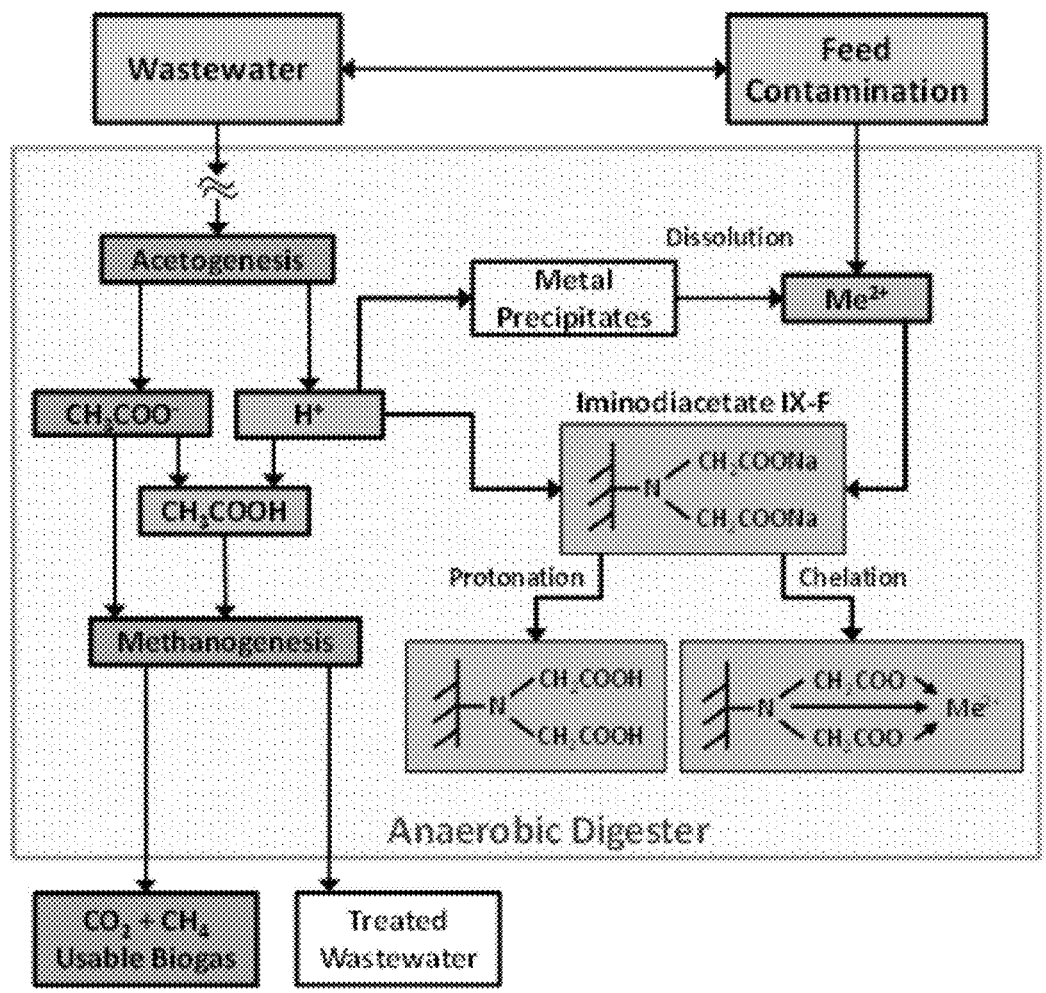
FIG. 1 is a schematic summarizing the approach for dissipation of protons and dissolved cationic metal ions in an anaerobic reactor by the presence of FIBAN X-1 iminodiacetate-functionalized ion exchange fibers (IXF).

The present invention is most clearly understood with reference to the following definitions:

As used herein, the singular form "a," "an," and "the" include plural references unless the context clearly dictates otherwise.

As used herein, the term "stabilize" means buffering pH fluctuations resulting from organic overloading and/or moderating a shock-load of dissolved toxic metal within a biological reactor.

As used herein, the term "treat" in the context of organic waste means to prepare the waste for disposal, as illustrated in the examples. This may be measured, by way of non-limiting example, by the chemical oxygen demand of the waste.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

While there are many microbial processes involved in MPABRs, the pH stability and toxic overloading issues primarily involve the final two steps. Here, facultative heterotrophs produce volatile acids (VFAs), mainly acetic acid by acetogenic bacteria, which is then converted to methane and carbon dioxide by anaerobic methanogens. When these processes are at steady-state, the rate of acid production is balanced by its uptake rate by the methanogens. An imbalance can occur when there is a sudden increase in the organic loading in the reactor. The acetogens have a higher growth rate and a wider pH range for growth than methanogens. Thus, when the soluble organics concentration increases, the acetogens produce more acetic acid, and if the methanogens cannot keep up with the acetic acid production, the reactor pH will begin to drop. If the pH drops outside of the methanogen's narrow growth range, their growth rate will slow, causing a further buildup of acetic acid and reduction in pH. This negative feedback cycle will ultimately result in cessation of methanogenic activity and reactor failure. The presence of toxic metal inhibitors to methanogenic archaea, such as copper, nickel, zinc and chromium, is another concern with anaerobic digestion. While pretreatment would be implemented for known inputs of toxic metals, the issue is accidental releases. Even though heavy metals can cause the failure of the anaerobic biological processes, present-day systems do not normally have any control mechanism to prevent such extremes. In order to make anaerobic digestion more attractive to industry, a simple and preferably passive method requiring minimal to no operator control needs to be developed to mitigate these issues.

To address this need, the present invention provides the use of ion exchange fibers (IXF) to passively buffer pH in MPABRs. Conceptually, this is an in-situ process control scheme where IXF, without any external intervention, removes excess $H^+$ resulting from an organic overload. Once the normal feed conditions are restored, IXF is expected to release $H^+$ back into solution—i.e., they self-regenerate within the system. They also have the added benefit of removing toxic metals that may be introduced into the reactor due to accidental releases. The incorporation of IX-F to stabilize an anaerobic biological reactor is illustrated in FIG. 1.

Accordingly, an aspect the present invention provides methane-producing anaerobic biological reactor, comprising an anaerobic digester configured to contain and maintain a microbial suspension; an inlet configured to direct an organic waste stream into the anaerobic digester and a plurality of ion-exchange fibers positioned to react with the microbial suspension contained within the anaerobic digester. A person of skill in the art will appreciate that "maintain" in this context means to control various parameters, by way of non-limiting example temperature, such that the microbes survive and reproduce. In various embodiments, the methane-producing anaerobic biological reactor further comprises a microbial suspension. In various embodiments the microbial suspension further comprises acetogenic bacteria and methanogenic bacteria.

In another aspect, the invention provides a methane-producing anaerobic biological reactor, comprising an anaerobic digester containing a microbial suspension, comprising acetogenic bacteria and methanogenic bacteria; an inlet configured to direct an organic waste stream into the anaerobic digester; a plurality of ion-exchange fibers within the anaerobic digester positioned to react with the microbial suspension, and an outlet for treated waste and methane produced in the anaerobic digester.

In various embodiments, the methanogenic bacteria has an optimal pH range for growth and activity between about 6.8 and 7.2. In various embodiments, the microbial suspension contains growth media and/or salts to facilitate the survival and activity of the bacteria.

A skilled artisan will recognize that a methane-producing anaerobic biological reactor includes some means by which various substances, including at least methane, may leave the reactor. The skilled artisan will further understand that the specific architecture of the reactor is not critical in this regard and all possible methods of egress for these substances are included in the various embodiments of the invention.

Advances in the development of ion-exchange materials have led to the production of very thin IXFs, on the order of 30 μm diameter, with properties that make them attractive for use in MPABRs. In various embodiments, thin fibers offer faster kinetics due to their smaller size. At the same time, in various embodiments IXFs allow practical installation in anaerobic reactors, where they can be easily suspended from the roof or walls of the reactor as woven mats or as porous pillows, and as necessary, their submergence into the reactors can be varied without any major difficulty.

Here, the present invention is demonstrated through application of IXFs FIBAN X-1 and FIBAN A-1 to passively stabilize MPABRs to variations in organic loading and to the shock input of a heavy metal, however, a skilled artisan will readily understand that the invention is not limited to a specific IXF fiber and that various IXF fibers may be used for this purpose. In various embodiments, the ion-exchange fibers may have a diameter of about 30 μm. In various embodiments, the ion-exchange fiber may have a proton absorption capacity of about 0.49 meq-$H^+$/g-fiber. The ratio of fiber to the volume of microbial suspension may be varied. In various embodiments, the MPABR may include at least about 2 g/L of ion exchange fibers. In various embodiments, the MPABR may include at least about 5 g/L of ion exchange fibers. In various embodiments, the MPABR may include at least about 10 g/L of ion exchange fibers.

Fiban X-1 contains the iminodiacetate functional group, which provides pH buffering capacity across a wide pH range:

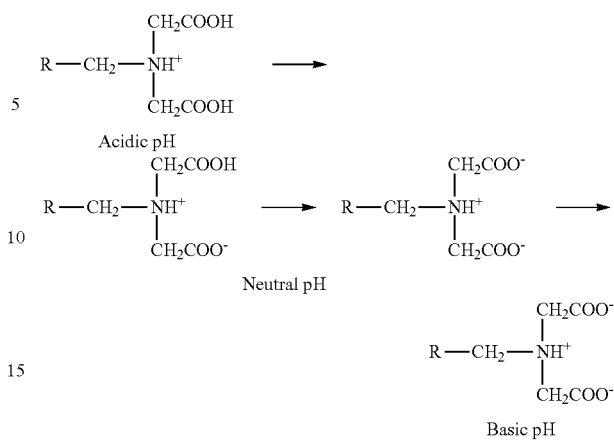

When FIBAN X-1 in the sodium form is placed in an MPABR, it will react with divalent ions, as iminodiacetate has a greater affinity for divalent ions than sodium:

$$R—CH_2N(CH_2COONa)_2+M^{2+}→R—CH_2N(CH_2COO)_2M+2Na^+ \quad \text{(Eq. 1)}$$

During an organic overloading event resulting in excess production of acetic acid, FIBAN X-1 will take up $H^+$ and release the divalent ions:

$$R—CH_2N(CH_2COO)_2M+2H^+→R—CH_2N(CH_2COOH)_2+M^{2+} \quad \text{(Eq. 2)}$$

Through this protonation process, FIBAN X-1 is converted to the hydrogen form, which buffers the reactor to pH decreases. When in the hydrogen form, weak acid ion exchange polymers can only remove cations associated with other weak acids (e.g., $Ca(HCO_3)_2$), and this allows the FIBAN X-1 fibers to regenerate as the alkalinity in the reactor recovers from the organic overloading event, e.g.:

$$R—CH_2N(CH_2COOH)_2+M(HCO_3)_2→R—CH_2N(CH_2COO)_2M+2H_2O+2CO_2 \quad \text{(Eq. 3)}$$

In this manner, the FIBAN X-1 fibers will buffer pH when acid production increases and then regenerate as the alkalinity increases.

The iminodiacetate functional group also exhibits high affinity toward metals and commonly encountered cations in the order of $H^+>Cu^{2+}>Ni^{2+}>Zn^{2+}>Mn^{2+}>Ca^{2+}>Mg^{2+}>Na^+$. An example cation-exchange reaction between dissolved calcium and copper ions with iminodiacetate functional groups is:

$$R—CH_2N(CH_2COO)_2Ca+Cu^{2+} \rightleftharpoons R—CH_2N(CH_2COO)_2Cu+Ca^{2+} \quad \text{(Eq. 4)}$$

In various aspects and embodiments of the invention, IXFs are used to passively stabilize anaerobic biological reactors to (i) pH variation due to organic overloading, and (ii) a shock load of a toxic heavy metal. The results in the below examples demonstrate that in various embodiments of the invention IXFs are capable of maintaining reactor stability during pH and toxic metal stresses.

In another aspect, the present invention provides a method of treating organic waste with a methane-producing anaerobic biological reactor, by providing a methane-producing anaerobic biological reactor, comprising an anaerobic digester comprising an anaerobic digester comprising a microbial suspension containing acetogenic bacteria, methanogenic bacteria and a plurality of ion exchange fibers; introducing organic waste into the methane-producing anaerobic biological reactor; maintaining the microbial suspension in contact with the organic waste and at least a portion of the plurality of ion-exchange fibers for a period of time and under conditions sufficient to treat the organic waste and produce methane and removing the treated organic waste and methane from the anaerobic digester. A skilled person will appreciate that while all the components must be combined at some point, the order is not critical. By way of non-limiting example, if the organic waste is introduced into the anaerobic digester prior to the ion-exchange fibers, this should still be construed as "introducing" and is viewed as within the scope of the invention.

The materials and methods employed in the following examples are discussed below.

Microbial Culture. The microbial culture was obtained from the anaerobic digester at the Bethlehem, Pa., wastewater treatment plant and maintained in a completely mixed 8 L reactor (termed the mother reactor, see FIG. 13A-13C). The mother reactor was step-fed once daily with a 35 day hydraulic residence time (HRT) at a temperature of 35° C., and it was used to provide the seed microbial culture for use in the individual experiments. The anaerobic growth media is provided in Table 1.

TABLE 1

Anaerobic Growth Media Composition

| Chemical | Concentration (mg/L) |
| --- | --- |
| $NH_4Cl$ | 800 |
| $KHCO_3$ | 400 |
| $MgCl_2 \cdot 6H_2O$ | 300 |
| $CaCl_2 \cdot 2H_2O$ | 100 |
| $Na_2HPO_4$ | 100 |
| $Fe(NH_4)_2(SO_4)_2 \cdot 6H_2O$ | 42 |
| Yeast extract | 20 |
| Cysteine | 10 |
| $MnCl_2$ | 4 |
| $Ni(CH_3CO_2)_2$ | 2 |
| $CoCl_2$ | 2 |
| Vitamin B12 | 0.5 |
| $NH_4VO_3$ | 0.5 |
| $Na_2SeO_3$ | 0.5 |
| $ZnCl_2$ | 0.5 |
| $CuCl_2$ | 0.5 |
| Sodium tungstate | 0.1 |
| Ammonium molybdate | 0.02 |
| $H_3BO_3$ | 0.01 |

Alkalinity was added to the growth media as $NaHCO_3$ at a concentration of 4 g/L, and lactose was provided as the carbon and energy source at a concentration of 10 g/L. The reactor was monitored for pH and methane generation to ensure stable operation over time. Methane generation was continuously measured using a liquid-displacement gas trap with an in-line NaOH $CO_2$-scrubber (FIG. 13).

Figure 2:
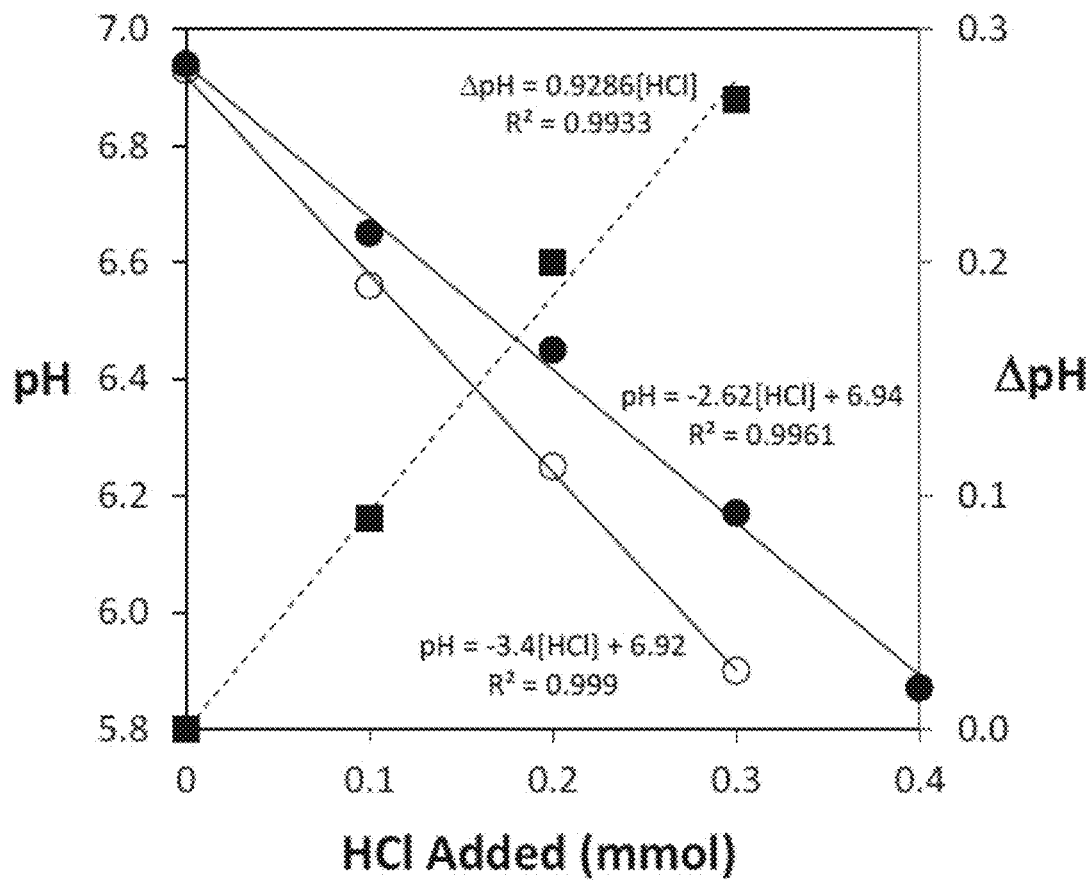
FIG. 2 shows the proton exchange capacity of FIBAN X-1 in a bacterial suspension.

Ion Exchange Fibers. The weak-acid IXF FIBAN X-1 and strong base IXF FIBAN A-1 were obtained from the Institute of Physical Organic Chemistry, Belarus. FIBAN X-1 is approximately 30 μm in diameter (FIG. 2). It contains the iminodiacetate functional group attached to a polyacrylonitrile (PAN) fiber matrix, and the proton exchange capacity is 0.49 mequiv $H^+$/g fiber (FIG. 2). FIBAN A-1 is approximately 50 μm in diameter and consists of the trimethylamine functional group attached to a fiber consisting of polypropylene grafted with copolymer of styrene and divinylbenzene. Two additional fibers without ion exchange capacity were also examined to identify any effects on reactor stability due to retention of biomass within the fiber mat. These included glass fiber (Fisher Scientific) and PAN fiber (Bluestar Dongda Chemical Co., Ltd.) with the same diameter as FIBAN X-1.

Organic Overload Experiments. The organic overloading experiments were conducted using 100 mL media bottles modified with gas and liquid sampling ports added to the cap (FIG. 13). The reactors were seeded with the microbial suspension from the mother reactor and then step-fed with anaerobic growth media, with the lactose and alkalinity concentrations varied depending on the experiment. The reactors were mixed on a magnetic stirrer in an incubator at 35° C., and pH and methane generation were measured as described above. Soluble COD was measured in the reactors by centrifuging samples at 9600 g for 1 min, followed by filtering the supernatant through a 0.2 μm cellulose nitrate membrane filter and measuring the solute using USEPA method 8000.

Four organic overload experiments (1-4) were conducted to examine the ability of FIBAN X-1 to stabilize anaerobic reactors to organic overloading events, with the events initiated through both an increase in influent organic concentration (single and repeat events) and a decrease in hydraulic residence time (HRT). Each experiment consisted of test reactors containing no fiber and different fiber mass loadings, and the reactors were initially run to steady-state conditions (stable pH and methane production) under the experiment's baseline loading, which required approximately 20 days. The reactors were stressed after approximately 2 weeks of steady-state operation by a 3-fold increase in the influent lactose concentration and a reduction in alkalinity (experiments 1-3), or a 3-fold decrease in the HRT (experiment 4). At the end of the overloading event, the reactors were returned to their baseline loadings. The specific conditions for each organic overload experiment are provided in Table 2.

TABLE 2

Organic overload experimental conditions

| Exp. | Test Reactors | Baseline Loading | Loading Event |
| --- | --- | --- | --- |
| 1 | No fiber<br>5 g/L glass fiber<br>5 g/L PAN fiber<br>5 g/L FIBAN X-1 | HRT = 28 days, step fed once daily<br>Influent lactose = 20 g/L<br>Influent alkalinity = 4.5 g/L as $NaHCO_3$ | Influent lactose increased 3-fold to 60 g/L<br>Influent alkalinity reduced to zero<br>One overloading period |
| 2 | No fiber<br>5 g/L glass fiber<br>5 g/L PAN fiber<br>5 g/L FIBAN X-1 | HRT = 28 days, step fed once daily<br>Influent lactose = 15 g/L<br>Influent alkalinity = 4.5 g/L as $NaHCO_3$ | Influent lactose increased 3-fold to 45 g/L<br>Influent alkalinity reduced to zero<br>Two overloading periods |
| 3 | No fiber, no overload<br>No fiber<br>2 g/L FIBAN X-1<br>10 g/L FIBAN X-1 | HRT = 26.7 days, step fed once daily<br>Influent lactose = 4.5 g/L<br>Influent alkalinity = 2.5 g/L as $NaHCO_3$ | Influent lactose increased 3-fold to 13.5 g/L<br>Influent alkalinity reduced to zero<br>One overloading period |
| 4 | No fiber, no overload<br>No fiber<br>2 g/L FIBAN X-1<br>5 g/L FIBAN X-1 | HRT = 15 days, step fed twice daily<br>Influent lactose = 10 g/L<br>Influent alkalinity = 4 g/L as $NaHCO_3$ | HRT decreased 3-fold to 5 days<br>One overloading period |

Metal Overload Experiments. Four different metal loading experiments (5-8) were conducted to demonstrate that FIBAN X-1 and FIBAN A-1 can reduce the effects of copper, nickel, and chromate loadings on anaerobic reactor operation. These experiments were set up and operated similarly to the organic overload experiments. The growth media was the same as the mother reactor, and the reactors were step-fed at an HRT of approximately 30 days. Reactor pH, methane generation, and aqueous metal concentration were measured over time, with the metal concentration determined by atomic adsorption spectroscopy (PerkinElmer AAnalyst 200). The specific conditions for each metal loading experiment are provided in Table 3.

TABLE 3

Metal overload experimental conditions

| Exp. | Test Reactors | Baseline Loading | Loading Event |
|---|---|---|---|
| 5 | No fiber<br>4 g/L FIBAN X-1 | HRT = 15 days, step fed twice daily<br>Influent lactose = 10 g/L<br>Influent alkalinity = 4 g/L as | Nickel as 30 mg/L $NiCl_2 \cdot 6H_2O$<br>Shock load on day 42 |
| 6 | No fiber<br>2 g/L FIBAN X-1<br>8 g/L FIBAN X-1 | HRT = 29.4 days, step fed once daily<br>Influent lactose = 10 g/L<br>Influent alkalinity = 4 g/L as | Copper as 30 mg/L $CuCl_2 \cdot 2H_2O$<br>Shock loads on days 32/33 and 93/94 |
| 7 | No fiber<br>2 g/L FIBAN A-1<br>6 g/L FIBAN A-1 | HRT = 29.4 days, step fed once daily<br>Influent lactose = 10 g/L<br>Influent alkalinity = 4 g/L as | Chromate as 25 mg/L $K_2Cr_2O_7$<br>Shock loads on days 32, 33, 34 |
| 8 | No fiber<br>8 g/L glass fiber<br>2 g/L FIBAN X-1<br>8 g/L FIBAN X-1 | HRT = 33.3 days, step fed once daily<br>Influent lactose = 10 g/L<br>Influent alkalinity = 4 g/L as | Nickel as 20 mg/L $NiCl_2 \cdot 6H_2O$<br>Shock loads on days 31, 33 and 34 |

Aging of FIBAN X-1. The IXF exchange capacity during aging in the microbial suspension was examined over 1 year of operation by placing 0.2 g of FIBAN X-1 in 100 mL anaerobic reactors operating under the same conditions as the mother reactor. The fibers were removed at 4, 8, and 12 months and placed into 100 mL of anaerobic growth media at a pH of 6.5. Nickel was added to each reactor at a concentration of 300 mg/L as $NiCl_2 \cdot 6H_2O$, and the equilibrium aqueous concentration of nickel was determined by atomic adsorption spectroscopy.

EXAMPLE 1

Buffering of ph Due to Organic Overloading

The optimal pH range for methanogens is between 6.8 to 7.2 and when pH is below 6.0, the methanogenic archaea will become severely inhibited. Given this range, the IXF FIBAN X-1 was examined for its proton adsorption capacity when placed in the microbial suspension during a decrease in pH from approximately 7 to 6. Here, titration was performed using hydrochloric acid solutions and the results are presented in FIG. 2. Circles are pH resulting from HCl addition to the microbial suspension without the IXF (solid circles) and with 1.8 g/L of the IXF (hollow circles). Squares show the difference in pH (ΔpH) between the two conditions as a function of added HCl. From this data FIBAN X-1's proton adsorption capacity across this range was calculated to be 0.49 meq-$H^+$/g-fiber.

Figures 5A, 5B, 5C, 5D, 5E, 5F:
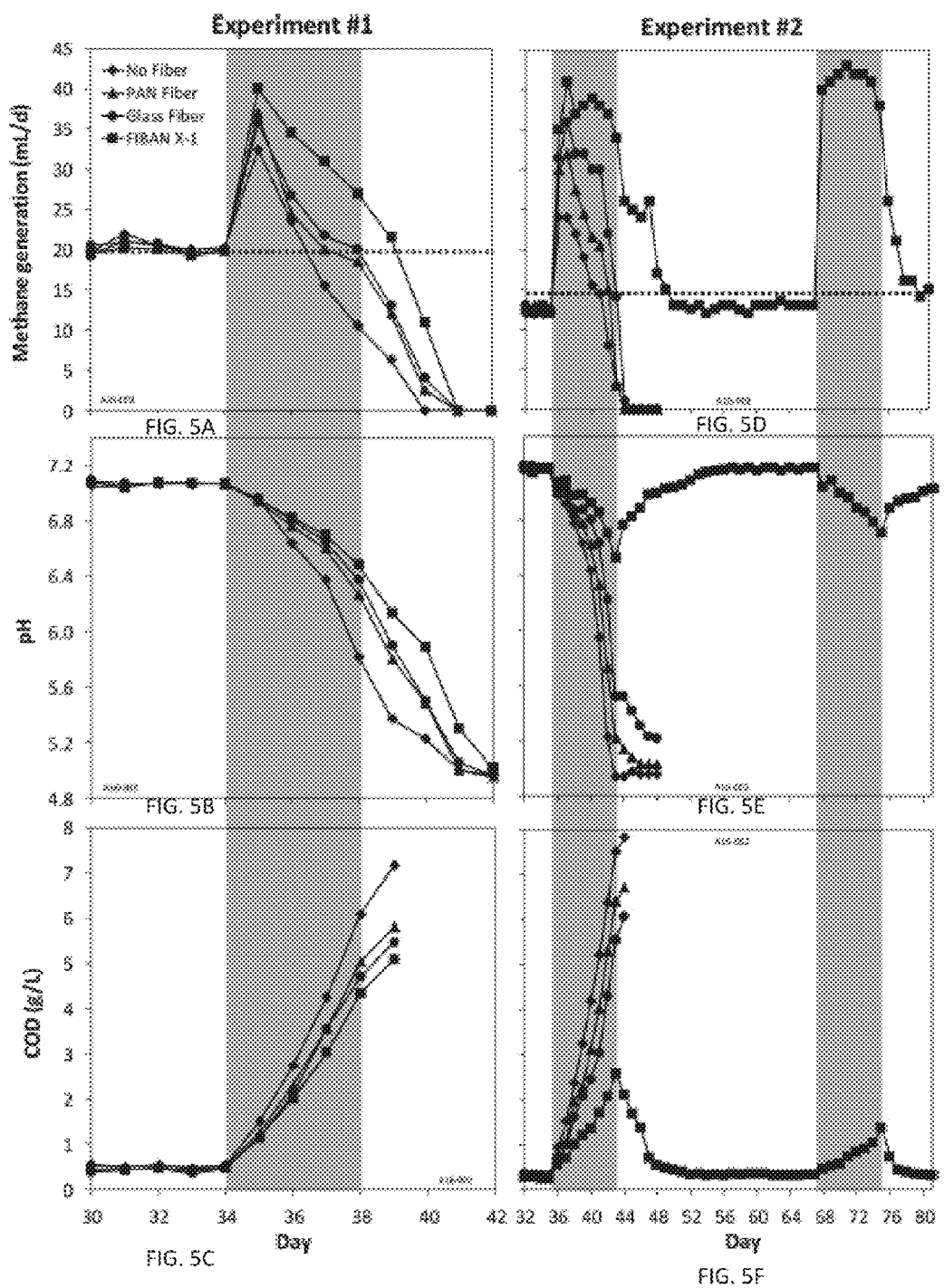
FIGS. 5A-5F show reactor performance to organic overloading stress events, depicted by the gray shading. The stress was initiated as a cessation of influent alkalinity and a 3-fold increase in influent lactose concentration, with prestress influent lactose concentrations of 20 and 15 g/L for experiments 1 and 2, respectively. Horizontal dashed lines are the theoretical methane generation rates under prestress loading conditions, calculated using the biological stoichiometric methane yield

The reactors reached and maintained steady-state conditions by 20 days of operation. As seen here (dashed line in FIG. 5) and in the upcoming experiments, the baseline methane generation rates were in good agreement with those predicted using the theoretical biological stoichiometric yield of 0.20 g of $CH_4$ produced per g of lactose consumed, even with the assumptions inherent in these calculations (see FIG. 1). The organic overloading stress event was applied from days 35 to 39, and the pH dropped in all reactors during the stress period. The methane production rates initially increased because of the increase in lactose loading, and they then decreased as the pH decreased in the reactors, indicating that the methanogenic archaea could not keep up with the increase in acid production. COD simultaneously increased by over an order of magnitude during the stress period. While the reactors in this initial experiment all failed from this severe stress (methane production ceased), there was a difference between reactors with no fiber, neutral PAN and glass fibers, and FIBAN X-1. The reactors with FIBAN X-1 demonstrated a resilience to the organic overloading, with methane production approximately 2.8× higher at the end of the stress period compared to that of the reactor with no fiber, and approximately 1.8× greater than those of the reactors with the neutral fibers. The enhanced performance with reactors containing the neutral fibers compared to that with the reactor with no fibers can likely be attributed to a higher biomass concentration and longer solids retention time due to observed biomass floc held within the fiber mat. This suggests that the benefits observed with FIBAN X-1 are pH buffering via ion exchange, supplemented by biomass retention in the fiber mat. For the second experiment, the influent lactose concentration was decreased to 15 g/L, and the 3-fold concentration increase during the overloading event was maintained. The reactors reached and maintained steady-state conditions after approximately 20 days, and the first of two organic overloading events was applied from days 36 to 43 (FIG. 5). Similar to experiment 1, the methane production rates initially increased because of the increased organic loading rate, and they then decreased as the reactor pH decreased. Concurrently, the COD concentrations increased during the stress event. As with the first experiment, there was an observable difference between the reactors with no fiber, neutral PAN and glass fibers, and FIBAN X-1.

Upon the cessation of the first overloading event, the reactor with FIBAN X-1 had an elevated methane production rate, while methane production ceased in the reactors without FIBAN X-1. The associated pH values in the reactors containing no fiber, PAN fiber, and glass fiber were 4.9, 5.1, and 5.5, respectively, and the pH in the FIBAN X-1 reactor was 6.5, demonstrating that FIBAN X-1 buffered the reactor pH and maintained it in the optimal range of methanogens. This facilitated use of the increased substrate concentration in the reactor, which was observed as the higher methane production rate and the lower COD concentration compared to those of the other reactors. Upon cessation of the stress period, the pH, COD, and methane production rate returned to the prestress levels in the reactor containing FIBAN X-1, while other reactors did not recover.

Figures 3A, 3B:
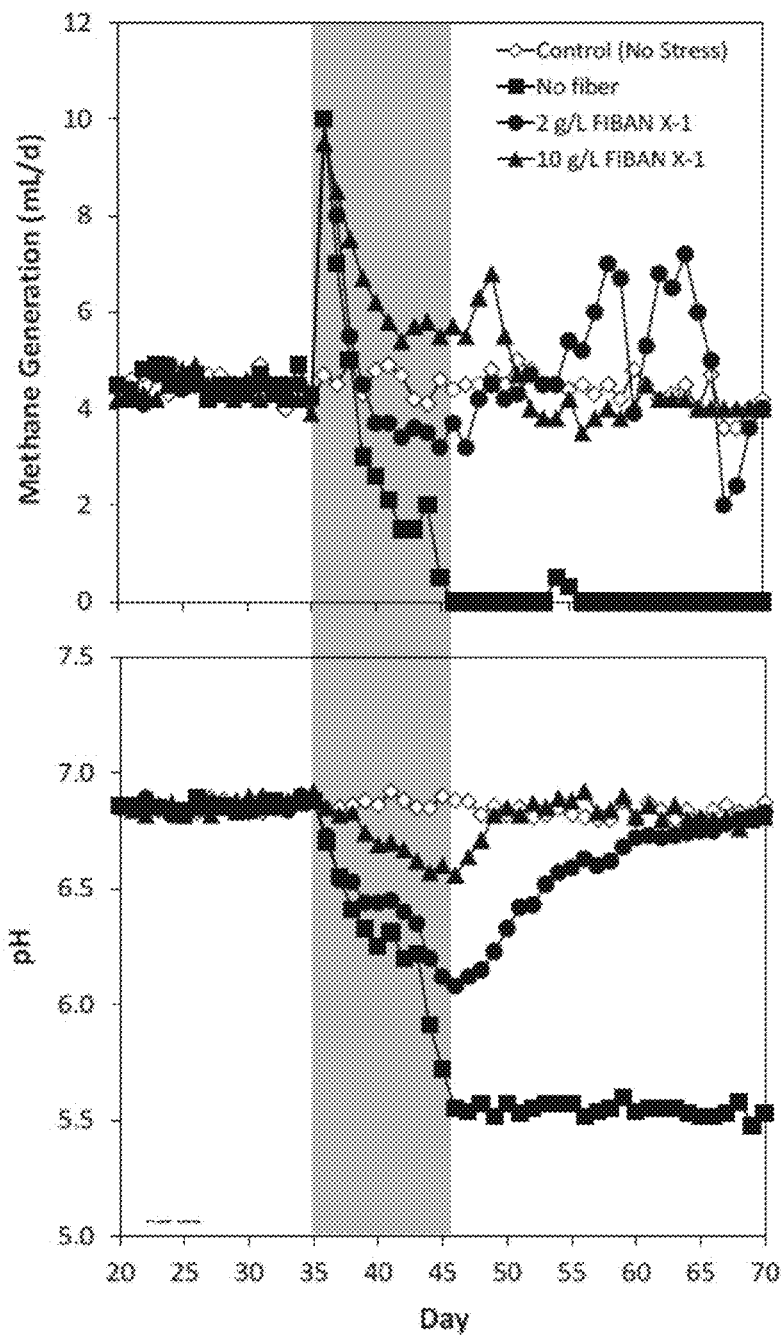
FIGS. 3A and 3B show results of an organic overloading experiment, with the overload initiated by an increase in organic substrate concentration in the influent.

Results from a lactose overloading are provided in FIG. 3. This experiment examined the performance of reactors with 0, 2 and 10 g/L of FIBAN X-1. These reactors were provided lactose at a concentration of 4.5 g/L (loading of 168 mg/L-d) and alkalinity at a $NaHCO_3$ concentration of 2.5 g/L (loading of 93.6 mg/L-d). The reactors contained 80 mL of liquid and were step-fed once daily with 3 mL of growth media, providing a hydraulic residence time (HRT) of 26.7 days. Once the reactors reached steady-state conditions, stress was applied by tripling the lactose concentration and reducing the influent alkalinity to zero over an 11 day period, after which the lactose and alkalinity concentrations were returned to the pre-stress levels.

The reactors reached and maintained steady-state after ~17 days and the organic overloading was conducted from days 36 to 46. The three stressed reactors all demonstrated a decrease in pH during the stress period, with the magnitude of the pH drop decreasing with increasing mass of FIBAN X-1 present in the reactor. The methane production rate initially increased in all three reactors due to the increased organic loading rate, and the rate then decreased over time as the pH decreased in the reactors. The reactor with no fiber failed at day 46 (methane generation ceased). At this time, the pH in the reactor had decreased to approximately 5.5, whereas the pH in the reactors with 2 g/L and 10 g/L of FIBAN X-1 had decreased to approximately 6.1 and 6.6, respectively. While methane generation in the 2 g/L reactor was moderately impacted during the stress period, it remained elevated in the 10 g/L reactor, indicating that the methanogens were not impacted by the minor pH decrease and they were able to utilize the increase in acetic acid production. Upon cessation of the stress period, the two reactors containing FIBAN X-1 were able to recover, whereas the reactor without fiber did not recover. The rise in methane production rate above the steady-state value in the 2 g/L reactor from days 56 to 67 suggests that the methanogens were able to utilize the substrate remaining in the reactor once the pH rose above approximately 6.4.

Figure 4A:
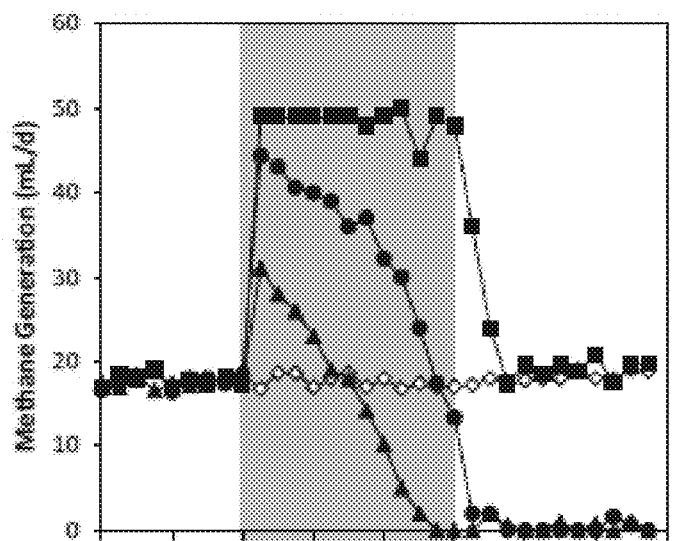
FIGS. 4A-4C show results of an organic overloading experiment, with the overload initiated by a decrease in the hydraulic residence time in the reactor.
Figure 4B:
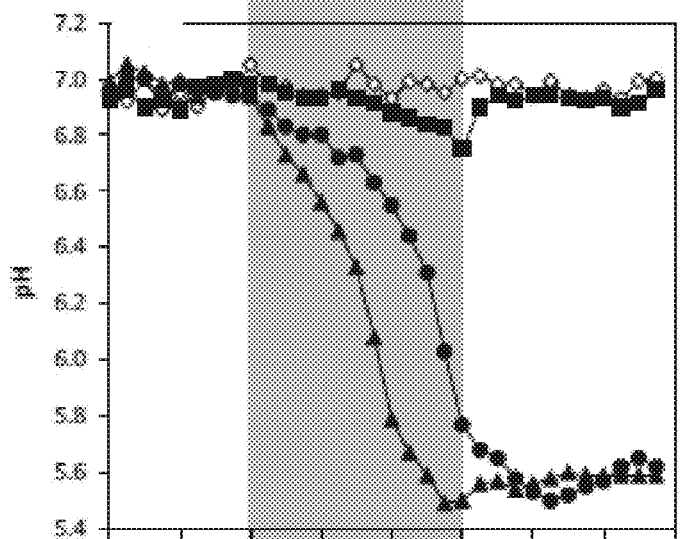
Figure 4C:
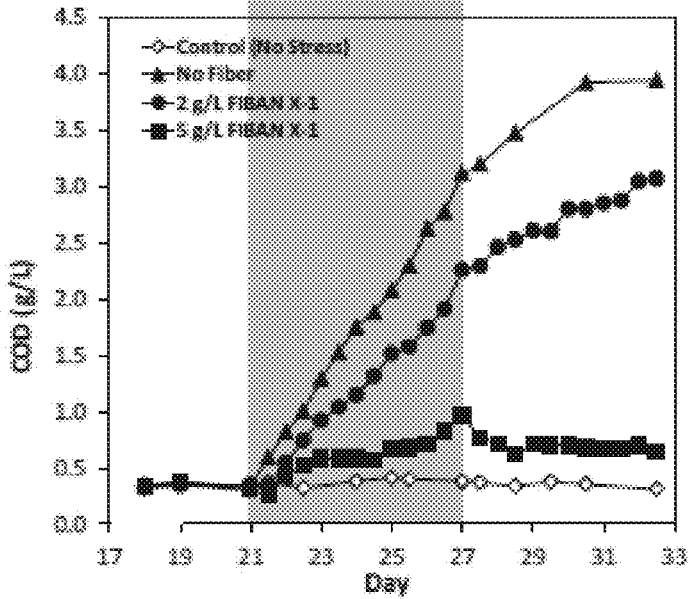

A second experiment examined an increase in organic loading via a reduction in the HRT. This form of overloading increases the organic loading rate and decreases the solids retention time, both of which will stress the reactors. The organic overloading was conducted as a decrease in HRT from 15 days to 5 days during experiment days 21 to 27 and the results of this experiment are summarized in FIG. 4. The reactor with 5 g/L FIBAN X-1 showed excellent resilience to the organic overloading event, with a stable pH, elevated methane production, and slight increase in reactor chemical oxygen demand (COD). The reactor with 2 g/L of FIBAN X-1 showed an initial increase in methane generation, but the pH buffering was not sufficient to maintain conditions for the methanogenic archaea to thrive and the reactor ultimately failed. This can be seen in FIG. 4, where the pH declined through the stress period and leveled off at approximately 5.5. The methane generation correspondingly decreased to zero and the COD increased throughout the remainder of the experiment. Similar results are seen with the reactor with no fiber, with the reactor failure occurring more rapidly than with the 2 g/L FIBAN X-1 reactor.

A third experiment demonstrated the ability of the IXF to respond to two sequential organic overloading experiments. Four conditions were examined: (i) no fiber and 5 g/L of (ii) neutral glass fiber, (iii) neutral polyacrylonitrile (PAN) fiber, which is the same backbone material as FIBAN X-1, and (iv) FIBAN X-1. The reactors were step-fed daily with lactose at a concentration of 15 g/L (loading of 532 mg/L-d) and alkalinity at a $NaHCO_3$ concentration of 4.5 g/L (loading of 160 mg/L-d). The reactors contained 93 mL of liquid and were step-fed once daily with 3.3 mL of growth media, providing an HRT of 28 days. Organic overloading was applied by tripling the influent lactose concentration and reducing the influent alkalinity to zero. Two eight-day organic overloading events were applied, with a three-week interval between the two events. Results from this experiment with two sequential organic overloading events are provided in FIG. 5. The reactors reached and maintained steady-state conditions after approximately 20 days and the organic overloading was applied as two events from days 36 to 43 and from 68 to 75. The methane production rate initially increased due to the increased organic loading rate, and it then decreased as the pH decreased in the reactors. Concurrently, the COD concentration increased during stress event. There was an observable delineation between the reactors with no fiber, neutral PAN and glass fibers, and FIBAN X-1, demonstrating that the ion-exchange capacity of FIBAN X-1 provides the buffering capacity, not simply the presence of fibers in the reactor. These results demonstrate that IXF can provide resilience to single organic overloading events, due to both an increase in influent organic concentration and a decrease in HRT, and to repeat overloading events, with the reactor stability a function of the amount of fiber present in the reactor.

Figure 11:
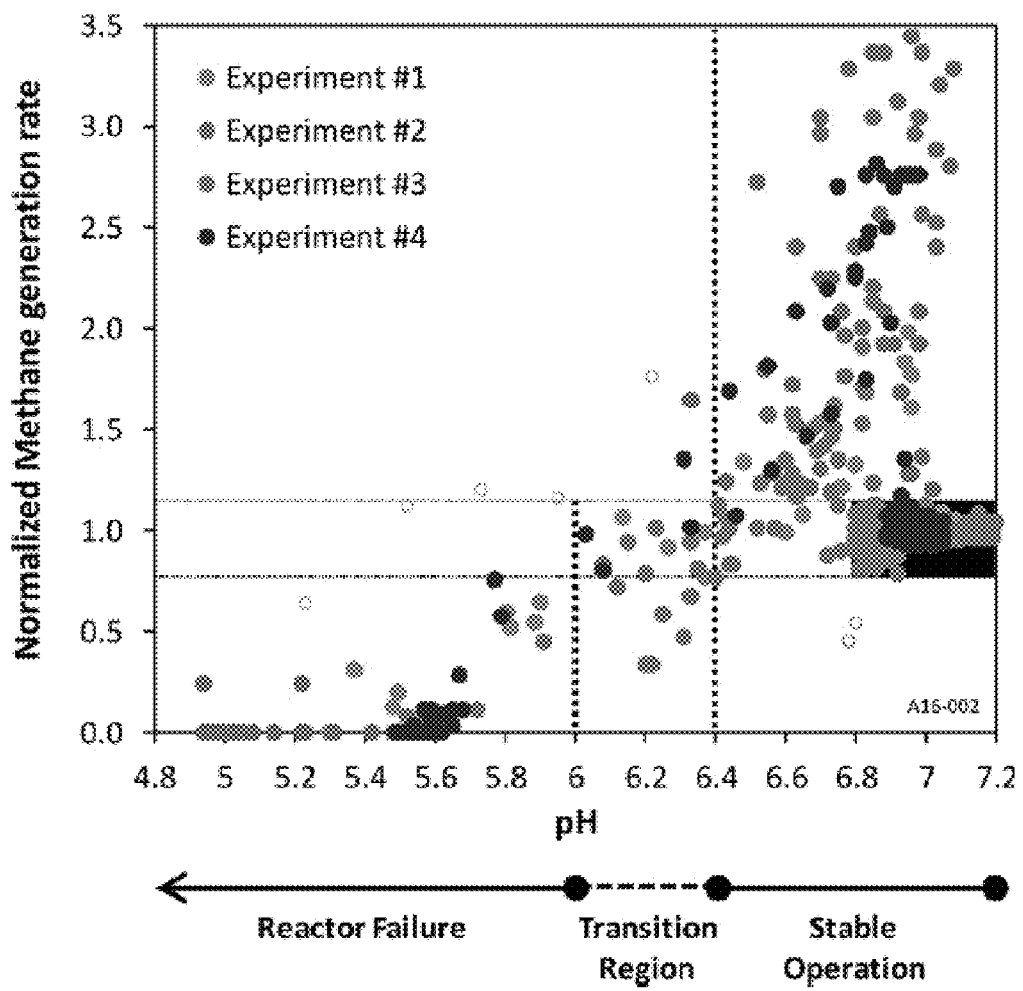
FIG. 11 depicts the relationship between solution pH and normalized methane production for all data points in FIGS. 3-5. Methane production is normalized by dividing the daily methane production rate by the average steady-state methane production. The black rectangle highlights the data from the steady-state operation of the reactors, and the horizontal lines delineate the upper and lower bounds of the steady-state methane production. Vertical lines depict regions of stable operation, transition, and reactor failure.

Two main factors can affect methane production during an organic overloading event. The first factor is positive, where the increase in organic substrate loading can result in a higher methanogen growth rate and an increase in methane production. The second factor is negative, where the increase in organic acid production can lower the pH and inhibit methane production. The purpose for introducing IXFs into the reactor is to passively mitigate the negative factor and maintain a suitable pH for methanogenic activity, allowing the positive factor to dominate and methane production to increase. The interrelationship between these two factors is seen in the experimental results presented in FIGS. 3-5. To elucidate this relationship across the different experiments, the methane production rates (mL/d) from the data in FIGS. 3-5 were normalized by dividing them by their associated average methane production rate during the pre-stress steady-state reactor operation. These normalized production rates are plotted as a function of reactor pH in FIG. 11, and examination of this figure shows three distinct operational regions. The first region is above pH 6.4, where, except for two data points shown as the hollow circles, the reactors operated at or above the steady-state values for methane generation in this region. It is in this region where FIBAN X-1 maintained the pH within the operational range of methanogens, allowing them to utilize the increase in substrate concentration. The second region is below pH 6, where the reactors were inhibited and the methane production rate was below the steady-state range. In this region, most measurements showed no methane production as the pH dropped below 5.5. The hollow symbols in this region are values from experiment 2 where the pH dropped rapidly over the course of the 24 h measurement period associated with the data points, and the cumulative methane production did not directly correspond to the final pH measured at the end of this period (i.e., the methane would have been generated while the pH was higher, earlier in the period). The range between pH 6.0 and 6.4 was a transition region where the methane generation rates spanned above and below the steady-state operational range. It is in this region that the reactors were tending to failure, and for the stresses applied in this study, recovery occurred only in reactors containing a sufficient mass of FIBAN X-1 to arrest the decline in pH. These results indicate that a sufficient mass loading of IXF should be identified in bench-scale testing that maintains pH≥6.4 for the system at hand, as this allows for continued operation during organic overloading events. Additionally, these experimental results suggest that the pH should not be allowed to decrease below 6.0 during an organic overloading event, as this resulted in continued pH decline and reactor failure.

EXAMPLE 2

Buffering of Heavy Metal Input

Figure 6A:
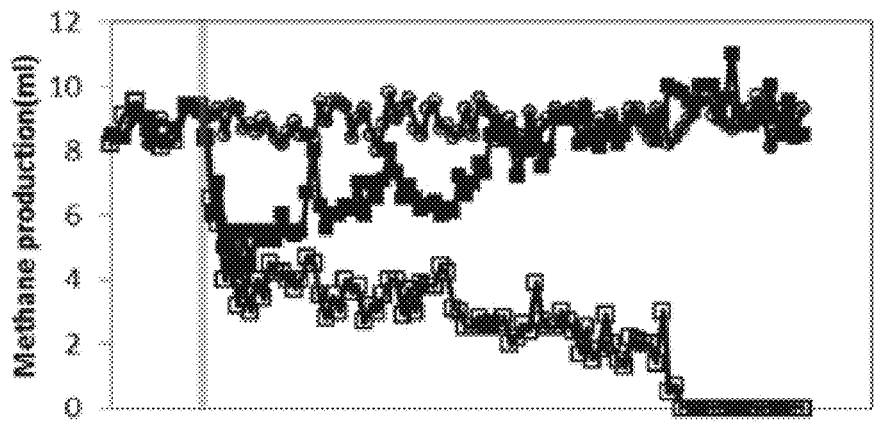
FIGS. 6A and 6B show the results of a nickel overload experiment.
Figure 6B:
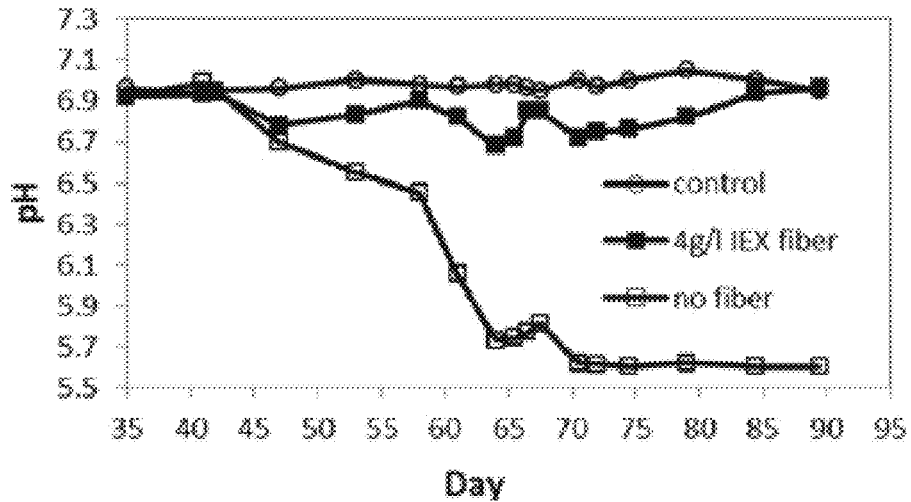
Figure 7:
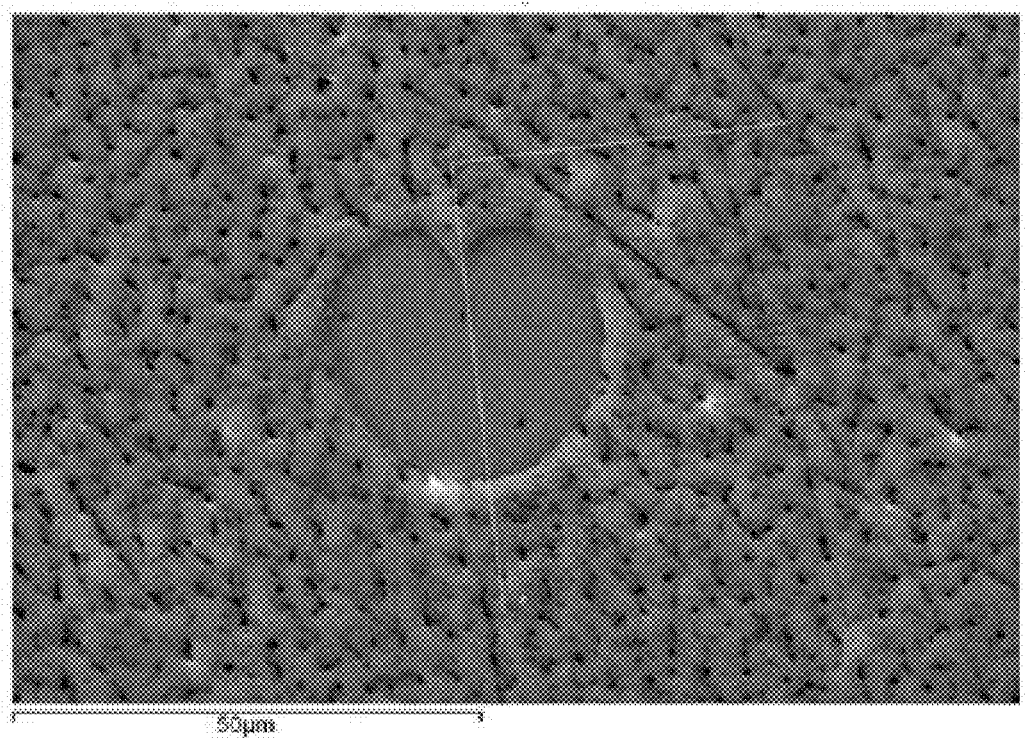
FIG. 7 shows a scanning electron microscopy image of the cross-section of an IXF, along with the relative nickel concentration across the fiber.

Nickel is a toxic heavy metal and its impact on MPABR performance was examined with and without the IXF FIBAN X-1 present. The reactors were step-fed daily with lactose at a loading of 667 mg/L-d (influent concentration of 10 g/L) and alkalinity at a $NaHCO_3$ loading of 267 mg/L-d (influent concentration of 4 g/L). The reactors contained 100 mL of liquid and were step-fed twice daily with 3.3 mL of growth media, providing a HRT of 15 days. After reaching steady-state conditions (approximately 30 days), a shock load of nickel of 12.15 mg of $NiCl_2.6H_2O$ (30 ppm) was added to the anaerobic reactors at day 42.5. The system was then monitored over time for its ability to recover from the shock-loading of nickel. FIG. 6 shows the result of this experiment, with the nickel loading event depicted by the shaded region. Methanogenic activity was immediately impacted by presence of nickel with a pH decrease continuing afterwards. The reactors with the IXF were able to mitigate the effects of the nickel addition and these reactors were able to recover. Whereas, the reactor without IXF failed (methane output went to zero) and was not able to recover. After exposure to nickel overloading, the use of ion exchange fiber was analyzed by Energy-Dispersive X-Ray Spectroscopy, which gave a clear nickel peak along the diameter of ion exchange fiber (FIG. 7).

Figure 8:
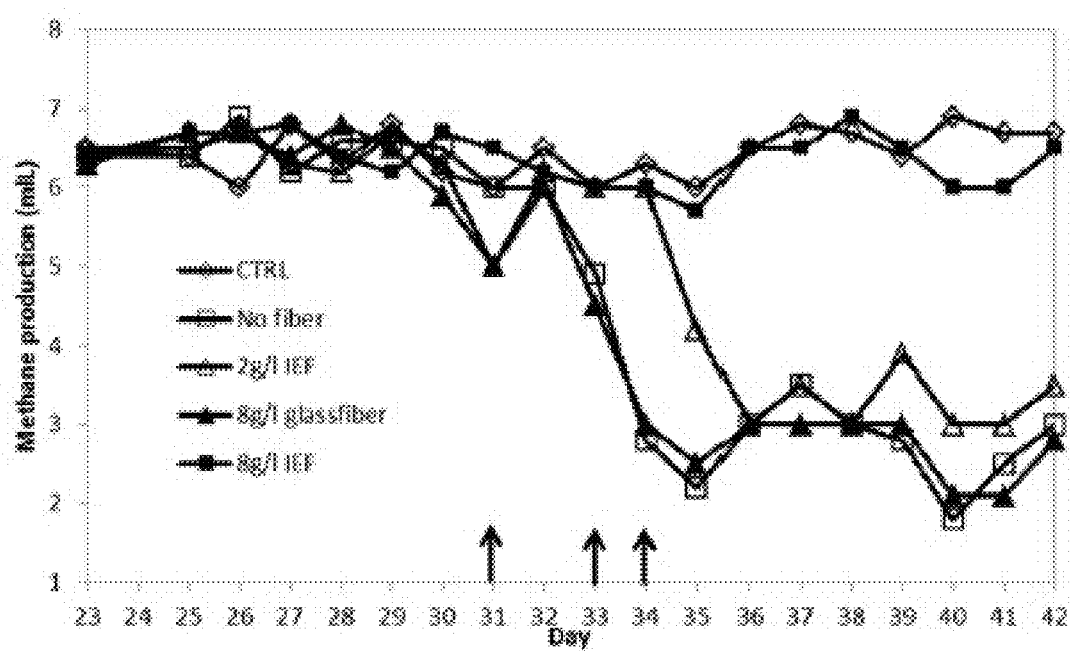
FIG. 8 shows the results of a nickel overloading experiment for both IXF and neutral glass fibers.

In a second nickel experiment, glass fiber was also used to compare the effects of neutral fiber versus the IXF FIBAN X-1. The reactors were step-fed daily with lactose at a loading of 333 mg/L-d (influent concentration of 10 g/L) and alkalinity at a $NaHCO_3$ loading of 133 mg/L-d (influent concentration of 4 g/L). The reactors contained 100 mL of liquid and were step-fed once daily with 3.3 mL of growth media, providing a HRT of 30 days. After reaching steady-state conditions (approximately 30 days), a shock load of 20 ppm nickel was added to the anaerobic reactors at days 31, 33, 34. The results are presented in FIG. 8, and it can be seen that in the reactor with glass fiber performed similarly to the reactor without fiber, with methane production decreasing rapidly. The reactor with 2 g/l IXF showed a decrease in methane generation after the third nickel addition. The reactor with 8 g/l IXF maintained methane production throughout the experiment. This demonstrated that neutral fiber does not provide any resilience to toxic metal inputs, whereas the IXF was able to mitigate the effects, with the impact a function of the mass of IXF present in the reactor.

Figure 9A:
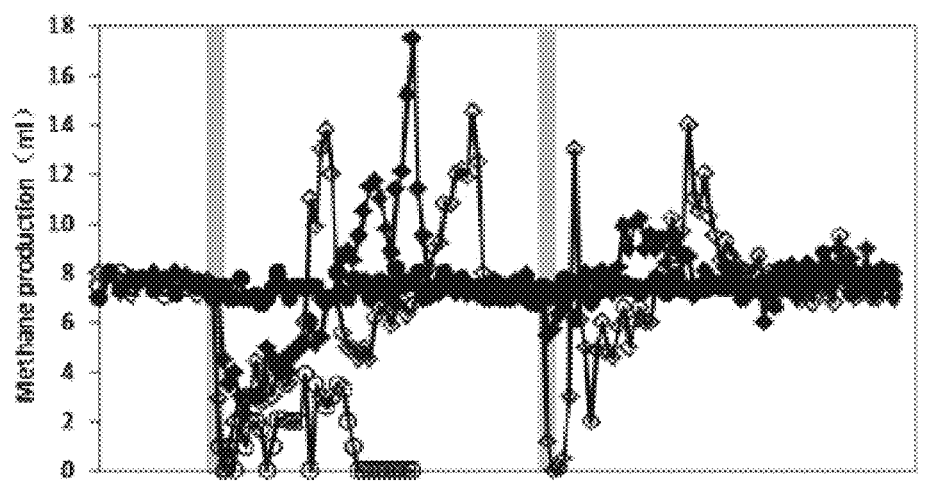
FIGS. 9A and 9B show the results of two consecutive copper loadings.
Figure 9B:
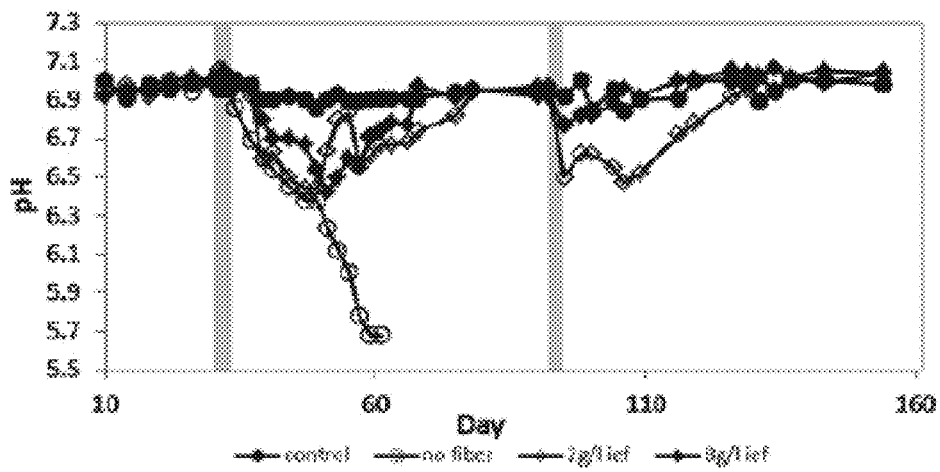

A third experiment was conducted using copper as the toxic metal. Here, 8 mg of $CuCl_2.2H_2O$ (47 mmole) was added to 100 mL anaerobic reactors at days 32-33 and 93-94, with using the IXF FIBAN X-1. The results are presented in FIG. 9 and the copper loading events are depicted by the gray shading. These results demonstrate the ability of the IXF to provide resilience to the copper loadings, with the reactors recovering from the loading events, whereas the reactor with the IXF failed. It is also seen that the reactors recovered more quickly during the second loading event, indicating that the microorganisms were able to acclimate to the presence of copper during the first loading event.

Figures 12A, 12B, 12C, 12D, 12E, 12F, 12G, 12H, 12I:
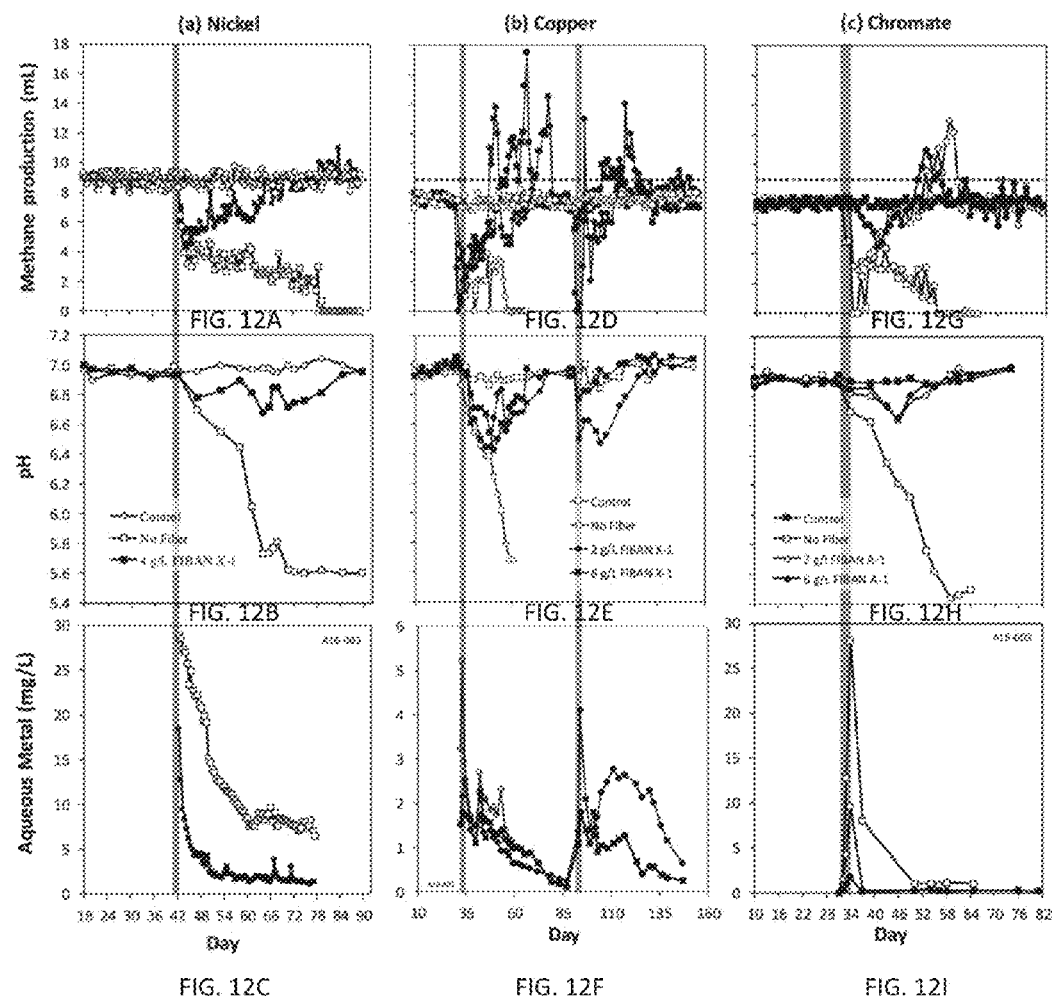
FIG. 12A-12I depict the results of experiments 5-7, showing IXF stabilization of the anaerobic reactors to inputs of nickel, copper, and chromate, respectively, depicted by the gray shading. Horizontal dashed lines represent the theoretical volume of methane generated during a sampling period under prestress loading conditions, calculated using the biological stoichiometric methane yield.

Results from the first metal loading experiment (experiment 5) are shown in FIGS. 12A-12C. The addition of nickel resulted in an immediate decline in methane production and slight drop in pH in both reactors. As expected, the aqueous nickel concentration was much lower in the reactor with FIBAN X-1 because of exchange onto the iminodiacetate functional groups. This was confirmed using SEM-EDX (FIG. 14A), showing nickel measured across the FIBAN X-1 fiber. The reactor with FIBAN X-1 recovered from the nickel loading. In contrast, the pH and methane production in the reactor without fiber continued to decline, with pH stabilizing at approximately 5.6 and methane production ceasing. This suggests that the nickel impacted the methanogens more than the acid-producing bacteria, leading to acid accumulation and inhibition of methanogenesis due to both the higher nickel concentration and the low pH.

Results with copper loading in FIGS. 12D-12F. are similar to the nickel results, where the two reactors with FIBAN X-1 recovered from the copper loading, and the reactor without FIBAN X-1 failed. One difference compared to the nickel experiment is that, because of the low solubility of copper in the neutral pH range, the aqueous concentration of copper was similar between the three reactors during the first loading event. The results suggest that the copper impacted the methanogens to a greater extent than the acidogens, resulting in acid accumulation and a rapid pH drop, and that the FIBAN X-1 mitigated the copper loading through pH control. The methane production was initially depressed, and it then increased above the baseline values as the pH recovered, indicating that the methanogens used excess acetate that accumulated while methanogenesis was impacted by the copper loading. The FIBAN X-1 reactors were allowed to recover, and then a second copper loading event was applied. The reactors with FIBAN X-1 recovered more quickly as compared to their response to the first event. In the first cycle, the days required for pH and methane production to recover in the reactor with 2 g/L FIBAN X-1 were 49 and 19 days, respectively, whereas, in the second cycle, they were 39 and 10 days. Similarly, in the reactor with 8 g/L FIBAN X-1, the corresponding data in the first cycle were 38 and 16 days, and in the second cycle they were 28 and 4 days. This enhancement during the second loading event is likely due to acclimation of the methanogens to the presence of the copper during the first cycle. Overall, both experiments 5 and 6 suggest that nickel and copper impacted the methanogens to a greater extent than the acid-forming bacteria, as observed in the decrease in pH, and that FIBAN X-1 mitigated the impact of the metal loadings through combination of metal exchange and pH buffering.

Figure 14B:
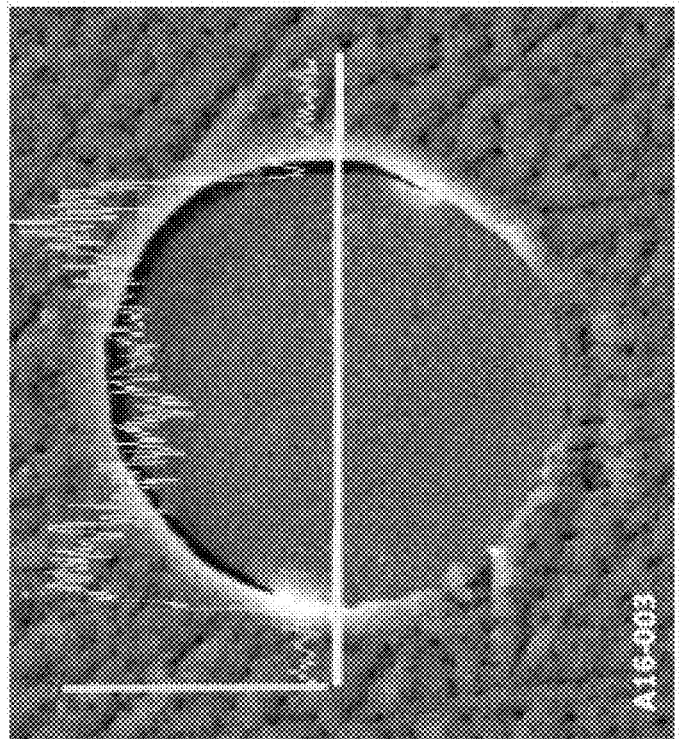
FIGS. 14A and 14B depict scanning electron microscopy coupled with energy dispersive x-ray (SEM-EDX) results showing nickel loading on FIBAN X-1 (FIG. 14A) and chromium loading on FIBAN A-1 (FIG. 14B).
Figure 14A:
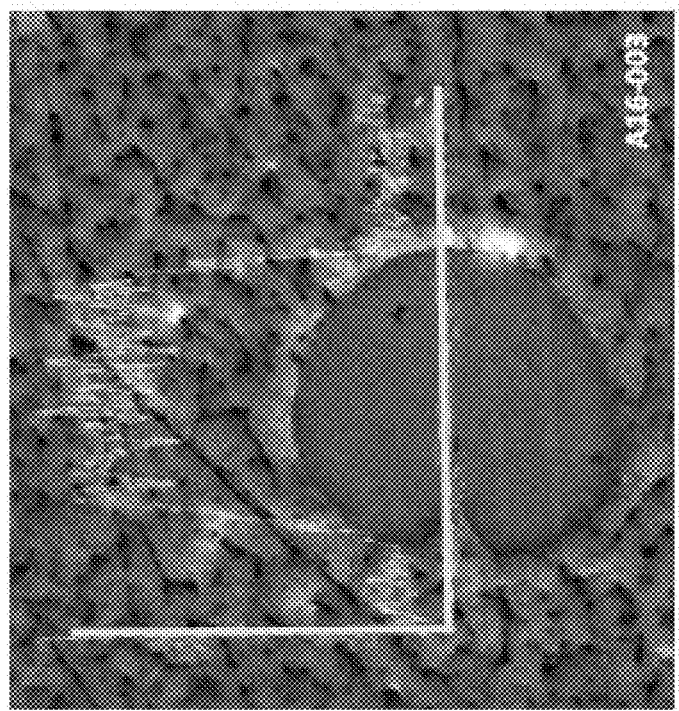
Figure 15A:
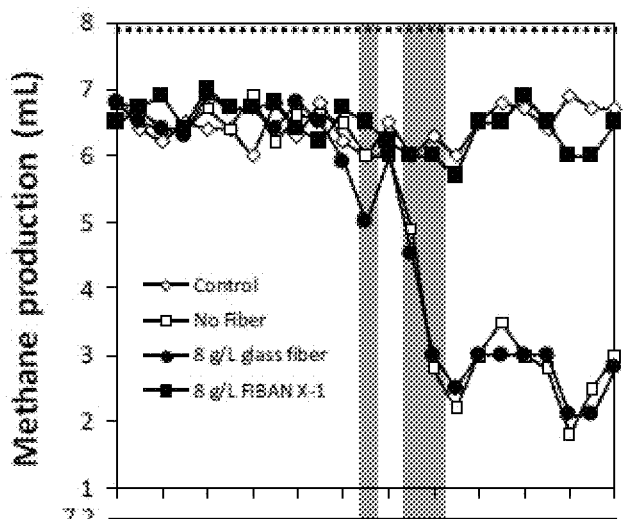
FIGS. 15A-15C depict reactor performance during multiple nickel loading events, depicted by the gray shading.
Figure 15B:
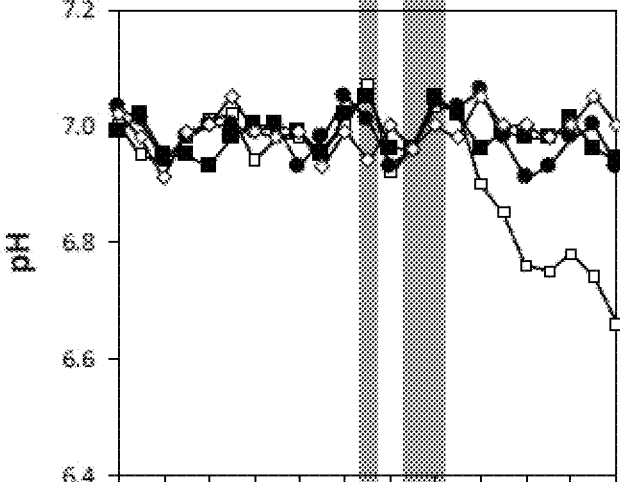
Figure 15C:
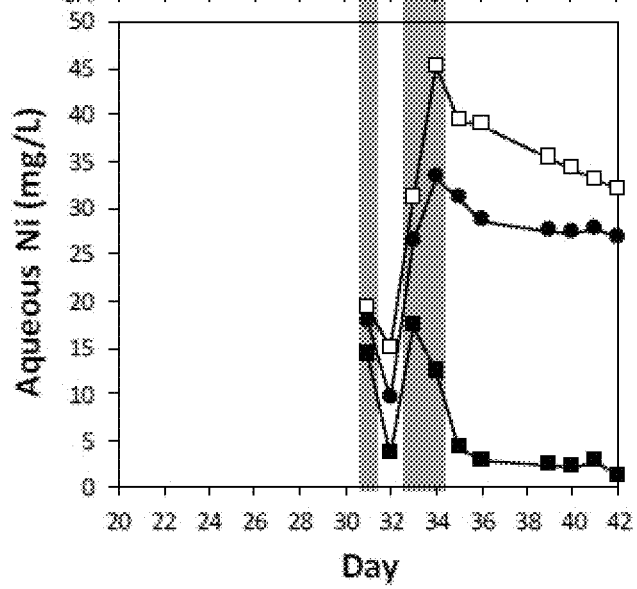

Results from the chromate loading experiment with the strong-base IXF FIBAN A-1 (experiment 7) are shown in FIGS. 12G-12I. The aqueous chromium concentration decreased with increasing FIBAN A-1 mass loading because of exchange onto the trimethylamine functional groups, and this was confirmed using SEM-EDX (FIG. 14B). The chromate input resulted in cessation of methane production for the reactor with no fiber; a rapid decline in production in the reactor with 2 g/L FIBAN A-1; and a gradual decline in production in the reactor with 6 g/L FIBAN A-1. Correspondingly, there was a minor drop in pH in the two reactors with FIBAN A-1 and a larger drop in the reactor without fiber, indicating that chromate impacted the methanogens to a greater extent than the acid-forming bacteria, similar to the observations with nickel and copper. All the reactors began to recover after the end of the shock period, and the reactors with FIBAN A-1 showed enhanced methane production as the pH recovered and as the methanogens utilized the accumulated acetic acid. Conversely, the reactor with no fiber was not able to recover quickly enough to overcome the decline in pH, and it subsequently failed as the pH continued to decline. The effects of both FIBAN X-1 and neutral glass fiber on reactor performance during a nickel exposure were compared in experiment 8, with the goal to demonstrate any effects of biomass retention by the fibers. The results, summarized in FIG. 15, showed large, nearly identical, reductions in methane generation for the reactors with no fiber and with 8 g/L of glass fiber, while methane generation in the reactor with 8 g/L of FIBAN X-1 was not impacted by the nickel exposure. There was a slight decrease in aqueous nickel concentration in the reactor with the glass fiber as compared to the reactor with no fiber. Visual inspection showed biomass being retained within the fiber mass, suggesting that the small reduction in aqueous nickel concentration with the glass fiber reactor was due to sorption on this additional biomass. The reactor with FIBAN X-1 showed a much lower aqueous nickel concentration, similar to that seen in experiment 5. Finally, the pH values in all reactors stayed above 6.6 during the experiment, indicating that it was the presence of nickel, not the pH, that caused the observed reduction in methane production. These results suggest that while the presence of fiber, whether IXF or neutral fiber, may help to retain biomass (as also indicated in the organic overloading experiments), only the IXF mitigated the input of nickel on reactor performance.

Overall, the results indicate that the input of toxic metals impacted the methanogens to a greater extent than the acid-forming bacteria. This was observed as a decrease in pH, and this decrease in pH then further impacted the methanogens and resulted in decreased reactor performance and reactor failure. The presence of FIBAN X-1 and FIBAN A-1 reduced these toxicity and pH effects and allowed the reactors to recover to the metal loading events. As with the organic overloading experiments, this approach is readily scaled-up, and given a particular waste stream, it should be possible to determine the mass of IXF necessary to mitigate a specified metal input through bench-scale experimentation.

EXAMPLE 3

Long-Term Operation of IXF in MPABRS

Figure 10:
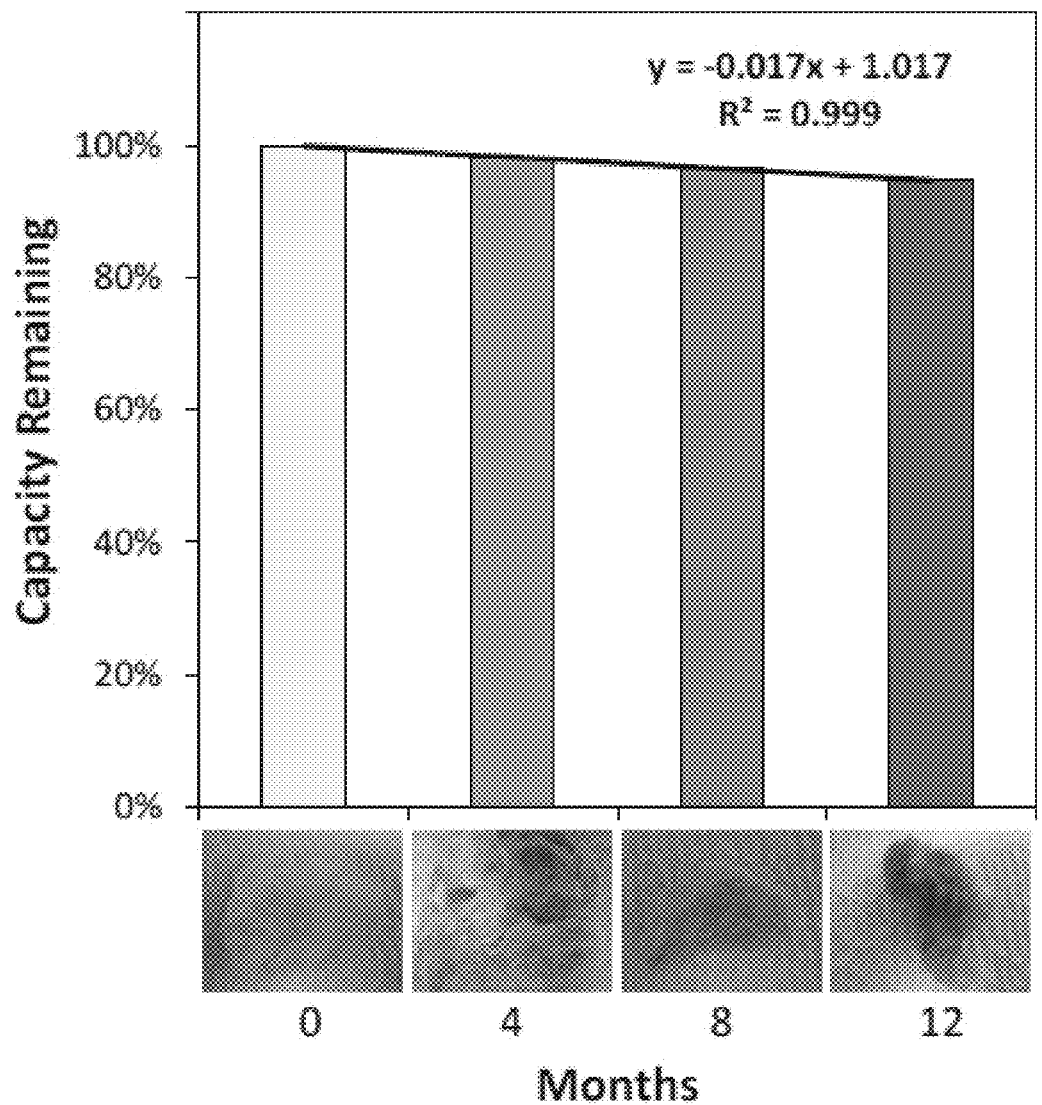
FIG. 10 shows results demonstrating minimal loss of ion exchange capacity during one year immersion in anaerobic biological reactors.

In order for an IXF to be viable for stabilizing MPABRs, it must be able to provide exchange capacity over time. This was examined here for FIBAN X-1 by placing it in reactors for up to one year and testing its capacity to exchange nickel. Nickel was used as the cation because of its high solubility and low concentration in the growth media, and unused FIBAN X-1 was able to absorb nickel with a capacity of 1.16 meq/g-fiber. During the one-year exposure period, a change in color of the fibers was observed, from white to an orange-brown (FIG. 10). Nevertheless, the available ion exchange capacity remained nearly the same after 12 months of presence inside the biological reactor, with a linear decrease to just under 95% of the original value, as shown in FIG. 10. This observation confirms that access to the IXF ion exchange sites remains essentially unaffected in an intense biological medium and the fibers may be able to last years before needing replaced.

Overall, these experiments demonstrated that IXFs can passively stabilize methane-producing anaerobic biological reactors to upset by (i) buffering pH fluctuations resulting from organic overloading and (ii) moderating a shock-load of dissolved toxic metal. This approach is readily scaled-up, and given an estimation of magnitude, duration and frequency of overloading events for a specific organic waste stream, it should be possible to determine the volume of IXF necessary to buffer the pH through bench-scale experimentation. These results provide positive data indicating that IXFs can be used to stabilize methanogenic reactors and development of this passive stabilization approach will assist in advancing the use of anaerobic biological processes for energy recovery from high-strength industrial organic waste streams.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. An anaerobic biological reactor, comprising:
   an anaerobic digester having a chamber configured to receive a microbial suspension;
   an inlet in fluid communication with the chamber, the inlet being configured to direct an organic waste stream into the anaerobic digester; and
   a plurality of ion-exchange fibers disposed within the chamber in position to contact and chemically react with microbial suspension received into the chamber of the anaerobic digester;
   wherein at least a portion of the ion exchange fibers are physically attached to the anaerobic digester.

2. An anaerobic biological reactor, comprising:
   an anaerobic digester having a chamber configured to receive a microbial suspension;
   an inlet in fluid communication with the chamber, the inlet being configured to direct an organic waste stream into the anaerobic digester; and
   a plurality of ion-exchange fibers disposed within the chamber in position to contact and chemically react with microbial suspension received into the chamber of the anaerobic digester;
   wherein the ion-exchange fibers have a diameter of about 30 μm.

3. An anaerobic biological reactor, comprising:
   an anaerobic digester having a chamber configured to receive a microbial suspension;
   an inlet in fluid communication with the chamber, the inlet being configured to direct an organic waste stream into the anaerobic digester; and
   a plurality of ion-exchange fibers disposed within the chamber in position to contact and chemically react with microbial suspension received into the chamber of the anaerobic digester;
   wherein the ion-exchange fibers have a proton adsorption capacity of about 0.49 meq-$H^+$/g-fiber.

4. A method for treating organic waste with a methane-producing anaerobic biological reactor, comprising:
   providing a methane-producing anaerobic biological reactor comprising an anaerobic digester containing a microbial suspension comprising acetogenic bacteria, methanogenic bacteria and a plurality of ion exchange fibers;
   introducing organic waste into the anaerobic digester;
   maintaining the microbial suspension in contact with the organic waste and at least a portion of the plurality of ion-exchange fibers for a period of time and under conditions sufficient to treat the organic waste and produce methane; and removing the treated organic waste and methane from the anaerobic digester;

wherein the ion-exchange fibers are physically attached to the anaerobic digester.

* * * * *